United States Patent
Ota et al.

(10) Patent No.: US 7,519,543 B2
(45) Date of Patent: Apr. 14, 2009

(54) PROMOTION METHOD AND SYSTEM

(75) Inventors: Michihiro Ota, Sakado (JP); Hiroaki Yoshida, Tsurugashima (JP); Hiroaki Shinada, Tsurugashima (JP)

(73) Assignee: Kabushiki Kaisha Nippon Conlux, Tokyo (JP)

( * ) Notice: Subject to any disclaimer, the term of this patent is extended or adjusted under 35 U.S.C. 154(b) by 1672 days.

(21) Appl. No.: 09/981,294

(22) Filed: Oct. 16, 2001

(65) Prior Publication Data

US 2002/0052789 A1   May 2, 2002

(30) Foreign Application Priority Data

Oct. 20, 2000   (JP)   ............................. 2000-321092

(51) Int. Cl.
*G06Q 30/00*   (2006.01)
(52) U.S. Cl. ....................................................... 705/14
(58) Field of Classification Search ................... 705/14
See application file for complete search history.

(56) References Cited

U.S. PATENT DOCUMENTS 6,061,660 A * 5/2000 Eggleston et al. ............. 705/14

FOREIGN PATENT DOCUMENTS

| JP | 10078989 A | 3/1998 |
|---|---|---|
| JP | 10254968 A | 9/1998 |
| JP | 11203561 A | 7/1999 |

OTHER PUBLICATIONS

Ota, et al., "*Promotion Method and System*"; U.S. Appl. No. 09/672,476, filed Sep. 28, 2001; USPTO.

* cited by examiner

*Primary Examiner*—Jeffrey D Carlson
(74) *Attorney, Agent, or Firm*—Husch Blackwell Sanders LLP Welsh & Katz

(57) ABSTRACT

A promotion method and a system which can realize thoughtful promotion by facilitating changing settings such as the number of points issued for each commodity, a promotion period and the like without the necessity for changing settings of target automatic vending machines all at once. A commodity code peculiar to each commodity is added to point information, and a data center selectively adds the number of points of the point information of the specific commodity on the basis of the commodity code.

12 Claims, 6 Drawing Sheets

PROMOTION METHOD AND SYSTEM

BACKGROUND OF THE INVENTION

1. Field of the Invention

The present invention relates to a promotion method for emphatic sales promotion of specific commodities by issuing points when such commodities are sold, and more particularly to a promotion method and a system which realize thoughtful promotion by adding a commodity code peculiar to each commodity to point information, and selectively adding the number of points of the point information of the specific commodities on the basis of the commodity code at a data center, thereby facilitating changing settings such as the number of point issued for each commodity, a promotion period and the like without the necessity for changing settings of target automatic vending machines all at once.

2. Description of the Related Art

For conventional promotion or the like of a particular commodity, a point is issued every time the pertinent commodity is purchased, and a purchaser of the commodity collects the points and redeems the points for a free gift or the like.

Such points are issued by various ways such as stamping or magnetically recording on a card owned by each purchaser, or affixing a seal or the like onto each commodity so that a purchaser collects such seals.

But, issuing the points in a form of affixing onto commodities is very troublesome for both sellers and purchasers in handling them.

A form which adds points to the card owned by each purchaser is hard to issue points by an automatic vending machine, and it is also hard to provide for nation-wide promotion sponsored by the manufacturer of the commodities.

And, all of the above types require the sponsor of the promotion lots of time and trouble to recover the points and totaling them.

To remedy such disadvantages, the inventor has proposed in Japanese Patent Application No. 11-280034 and Japanese Patent Application No. 2000-210217 a promotion method by which point information having points encrypted is shown to a commodity purchaser when a commodity is sold, the purchaser sends the shown point information to a center unit by a communication device such as a portable telephone or a personal computer, the center unit deciphers the point information and adds points, and a seller provides service according to the added points.

But, the aforesaid promotion method has a problem that the promotion of a particular commodity cannot be performed different from other commodities for a particular period only.

For example, when the promotion of a particular commodity is emphatically performed for a given period, thoughtful promotion, e.g., the number of points of the pertinent commodity is doubled for the given period, cannot be made.

In other words, the aforesaid conventional method must change the setting of points in each automatic vending machine in order to change the points of the commodity, and in order to promote the particular commodity for a limited period as described above, it is necessary to change the settings of all the automatic vending machines selling the pertinent commodity all at once.

SUMMARY OF THE INVENTION

Accordingly, it is an object of the present invention to provide a promotion method and a system which can realize thoughtful promotion by facilitating a change of settings, such as the number of issued points, a promotion period and the like, for each commodity without the necessity to change the settings of subject automatic vending machines.

In order to achieve the aforesaid object, the promotion method of the present invention is a promotion method by which point information related to predetermined points is shown to a user when a commodity is sold, the user sends the shown point information together with identification information of the user to a center unit, and the center unit stores and manages points corresponding to the received point information in connection with the user and provides a predetermined service to the user on the basis of the stored and managed points, comprising the steps of:

adding a commodity code peculiar to a commodity used to identify the commodity to the point information to be shown to the user, and selectively processing, by the center unit, points corresponding to point information containing a particular commodity code among the received point information.

The commodity is sold by an automatic vending machine, and the commodity code is added to the point information in correspondence with the number of a column in which the commodity is stored in the automatic vending machine.

The commodity code is added to the point information in correspondence with a serial number indicated on the commodity.

The commodity code is added to the point information on the basis of information of a bar code related to the commodity indicated on the commodity.

The center unit compares the commodity code added to the received point information with a particular commodity code previously stored and, when they agree with each other, adds a predetermined point to points corresponding to the point information containing the commodity code.

The commodity code peculiar to the commodity for identifying the commodity and information of a date when the commodity is sold are added to the point information shown to the user, and when the commodity code added to the point information agrees with a predetermined commodity code and the date information added to the point information is within a predetermined period, the center unit adds predetermined points to points corresponding to the point information containing the commodity code.

The promotion system of the present invention is also a promotion system by which point information related to predetermined points is shown to a user when a commodity is sold, the user sends the shown point information together with identification information of the user to a center unit, and the center unit stores and manages points corresponding to the sent point information in connection with the user and provides a predetermined service to the user on the basis of the stored and managed points, wherein the system comprises:

point information issuing means for issuing point information to which a commodity code peculiar to a commodity for identifying a commodity to be sold to the user, and point processing means disposed on the center unit for selectively process points corresponding to point information containing a particular commodity code among the received point information.

The commodity is sold by an automatic vending machine, and the point information issuing means issue the commodity code added to the point information in correspondence with the number of a column in which commodities in the automatic vending machine are stored.

The point information issuing means issue the commodity code added to the point information in correspondence with a serial number indicated on the commodity.

The point information issuing means issue the commodity code added to the point information on the basis of information of a bar code related to and indicated on the commodity.

The point processing means compare the commodity code added to the received point information with a previously stored particular commodity code and, when they agree, add predetermined points to points corresponding to the point information containing the commodity code.

And, the point information issuing means issue point information, to which a commodity code peculiar to a commodity for identifying the commodity and information of a date when the commodity is sold are added, to the user, and the point processing means, when the commodity code added to the point information agrees with a predetermined commodity code and the date information added to the point information is within a predetermined period, add predetermined points to points corresponding to the point information containing the commodity code.

According to the present invention, the commodity code peculiar to a commodity is added to the point information, the data center performs processing such as adding a predetermined number of points to the number of points of the point information in correspondence with the commodity code, so that a change of setting of points for each commodity, e.g., the number of points for a particular commodity is doubled for a predetermined period only, can be made by the data center. Thus, flexible promotion can be made.

DESCRIPTION OF THE PREFERRED
EMBODIMENTS

Embodiments of the promotion method to which the present invention pertains will be described in detail with reference to the accompanying drawings.

Figure 1:
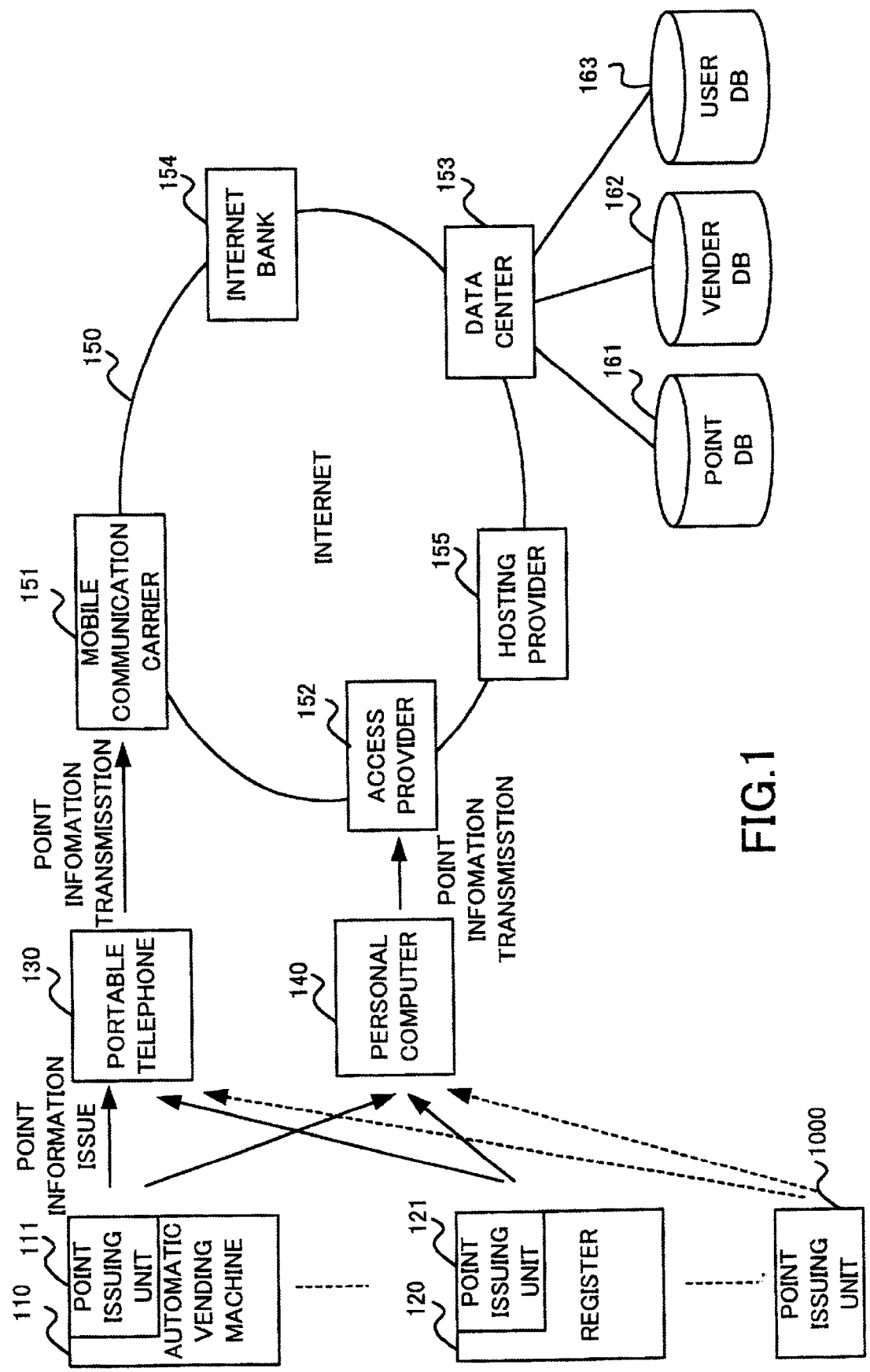
FIG. 1 is a system configuration diagram showing an example configuration of the promotion system according to the present invention.

FIG. 1 is a system configuration diagram showing an example configuration of the promotion system according to the present invention.

In FIG. 1, this promotion system issues points for commodities soled by a plurality of automatic vending machines 110 disposed outdoors or indoors or cash registers 120 disposed in various types of stores and shops.

Specifically, this promotion system enables the sales promotion of commodities sold by the automatic vending machines 110 or the sales promotion of various kinds of commodities in stores and shops where the cash registers 120 are provided.

Every time a commodity is sold by the automatic vending machine 110, point issuing unit 111 disposed in the automatic vending machine 110 generates point information corresponding to the selling price, sold quantity and the like of the sold commodity and indicates the point information on an unshown display section disposed on the point issuing unit 111 to show it to a user of the automatic vending machine 110.

Every time sales processing is made by the cash register 120, point issuing unit 121 disposed in the cash register 120 also generates point information corresponding to the selling price, sold quantity and the like of the sold commodity and indicates the point information on an unshown display section disposed on the point issuing unit 121 to show it to a user of a store or the like where the cash register 120 is provided.

Every time predetermined sales processing is made, independent point issuing unit 1000 also generates point information corresponding to the selling price, sold quantity and the like and indicates the point information on an unshown display section disposed on the point issuing unit 1000 to show it to a user.

The aforesaid point information contains the following:
1) a module code,
2) a secret code, and
3) a commodity code.

Here, the module code is used to identify the aforesaid point issuing units 111, 121 and the like, and this promotion system is configured to store and manage the states of the automatic vending machine 110, the cash register 120 and the like in accordance with the module code by vender database (vender DB) 162 of data center 153.

The secret code contains the following:
1) point issue number,
2) number of points, and
3) parity.

Here, the point issue number is a serial number issued every time points are issued by the point issuing units 111, 121 respectively and used to check double use and unauthorized use of the point information.

The number of points is the number of points which a user obtains at every purchase, and the parity is additional information used to check that the point information transmitted from the user is free from an error or tampering while being transmitted including encryption and decryption processing.

The secret code is generated by encrypting such information by a previously recorded cryptographic key.

The commodity code is information peculiar to each commodity and used to identify the sold commodity at the data center 153.

Here, it is possible to configure the point issuing unit 111 disposed in the automatic vending machine 110, so that the commodity code is generated in correspondence with the number of a column, where the commodities are stored in the automatic vending machine, and added to the aforesaid point information.

It is also possible to configure so that the commodity code is generated on the basis of a serial number indicated on commodities or information on a bar code about the commodity indicated on the commodity and added to the point information.

The commodity code may be included in either the aforesaid module code or the secret code.

The user of the promotion system reads and records the point information indicated on the display sections of the point issuing units 111, 121, 1000, inputs the recorded point information to portable telephone 130 or personal computer 140 and sends it to the data center 153 together with ID (identification information) for identifying the user and a predetermined password.

An IR communication device may be built in the point issuing units 111, 121, 1000 to input the point information to the portable telephone 130 or the like by the IR communication device.

The point issuing units 111, 121, 1000 may be provided with means for printing to output the point information.

The point issuing unit 121 mounted on the cash register 120 may be designed to print to output the point information generated by the point issuing unit 121 onto a receipt printed by and output from the cash register 120.

The data center 153 is provided with point database (point DB) 161 which is configured as a web server on the Internet 150 and stores and manages the points obtained by the user in correspondence with the user ID, the vender database (vender DB) 162 which stores and manages the states and the like of the automatic vending machine 110 and the cash register 120 according to the module code, and user database (user DB) 163 which stores and manages individual information of the users.

The point information is transmitted from the portable telephone 130 carried by the user to the data center 153 through the portable telephone 130, mobile transmission carrier 151 and the Internet 150.

The point information is transmitted from the personal computer 140 of the user to the data center 153 through the personal computer 140, user access provider 152 and the Internet 150.

The data center 153 receives the point information from the user's portable telephone 130 or the personal computer 140 and checks the user ID and password with reference to the user database 163.

Then, the module code is checked with reference to the vender database 162.

The secret code is decrypted, the parity, the point issue number, the number of points and the commodity code are checked, and the point database 161 is updated according to the checked results.

It may also be configured in that information on a date when the commodity is sold is added to the point information which is shown to the user in addition to the aforesaid commodity code, and when the commodity code added to the point information agrees with a predetermined commodity code and the date information is within a predetermined period, the data center 153 adds a predetermined point to the points corresponding to the point information containing the commodity code.

The data center 153 also conducts the following:
1) management of the users on the basis of registration and update of the user database 163,
2) management of points on the basis of the point database 161,
3) management of the point issuing unit on the basis of registration and update of the vender database 162,
4) management of various types of lotteries and winners on the basis of the points stored in the point database 161,
5) provision of marketing information to the administrator of the automatic vending machines 110 and stores and shops or the like where the cash register 120 is disposed, and
6) sales information, commodities, changes, failures and the like of the automatic vending machines 110.

The Internet 150 has thereon Internet bank 154 which settles an account related to the aforesaid points for the data center 153, hosting provider 155 which serves instead of the data center 153 to deliver home pages in order to provide marketing information to the administrator of the automatic vending machines 110 and the stores and shops or the like where the cash register 120 is disposed, and the like.

To explain the promotion system more intelligibly, point issuing processing by the automatic vending machine 110 will be described.

First, a structure of the automatic vending machine 110 which adopts this promotion system will be described.

Figure 2:
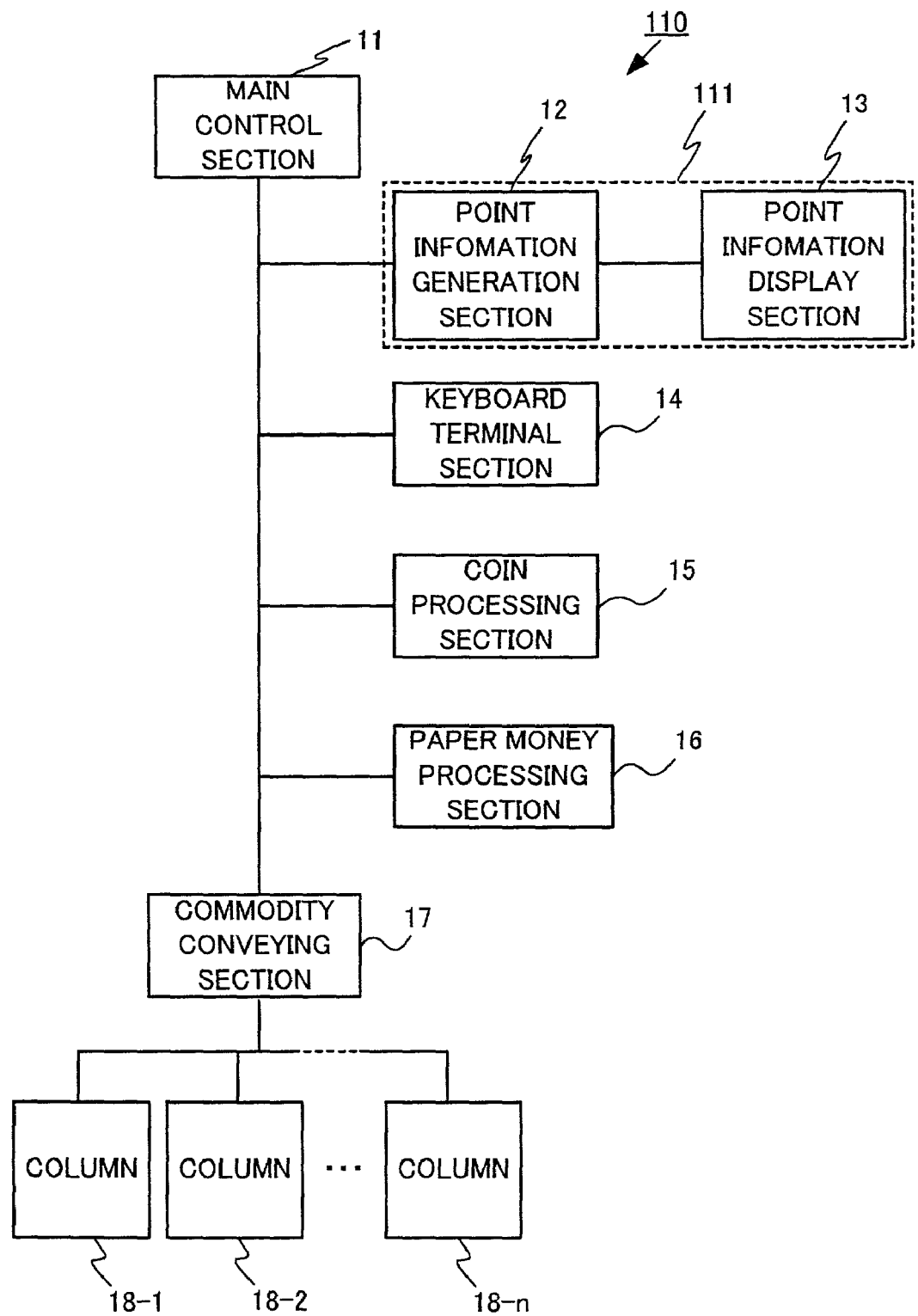
FIG. 2 is a block diagram showing a structure of the automatic vending machine shown in FIG. 1.

FIG. 2 is a block diagram showing the structure of the automatic vending machine 110 adopting this promotion system.

As shown in FIG. 2, the automatic vending machine 110 comprises main control section 11, keyboard terminal section 14, coin processing section 15, paper money processing section 16, commodity conveying section 17 and columns 18 (18-1 to 18-n), and also has the point issuing unit 111 which comprises point information generating section 12 and point information display section 13.

The main control section 11 controls the respective sections to control the sales of commodities and issue of points. The point information generating section 12 generates point information on the basis of a control signal from the main control section 11, and the point information generated by the point information generating section 12 is indicated as visible information (a character string etc.) on the point information display section 13.

The keyboard terminal section 14 makes various kinds of settings such as prices and others of commodities to be sold. The coin processing section 15 accepts coins for a commodity and returns change, and the paper money processing section 16 accepts paper money and does other operations. The commodity conveying section 17 processes to dispense a commodity on the basis of a control signal from the main control section 11 and controls the dispense of commodities stored in the columns 18. The columns 18 store commodities respectively.

Points are issued by the point information generating section 12 which generates point information on the basis of a control signal from the main control section 11 and indicates the point information on the point information display section 13.

When a commodity is purchased, the main control section 11 gives an instruction to the point information generating section 12 to issue points, and it can be determined whether the instruction is given to every column 18, namely each commodity to be sold.

It can also be set so that when a plurality of commodities are purchased, the instruction is given by the main control section 11 to the point information generating section 12 to issue points according to the purchased quantity.

Further, the main control section 11 records commodity codes of various commodities stored in the columns 18 in correspondence with the column numbers of the columns 18, and the commodity codes are set by a worker who operates the keyboard terminal 14 when the commodities are supplemented.

It may be designed that a bar-code reader is mounted on the automatic vending machine, and a customer makes the bar-code reader read a bar code printed on a purchased commodity, so that the commodity code is obtained according to information on the read bar code.

It may also be configured to obtain the commodity code on the bases of the serial number indicated on the commodity.

Figure 3:
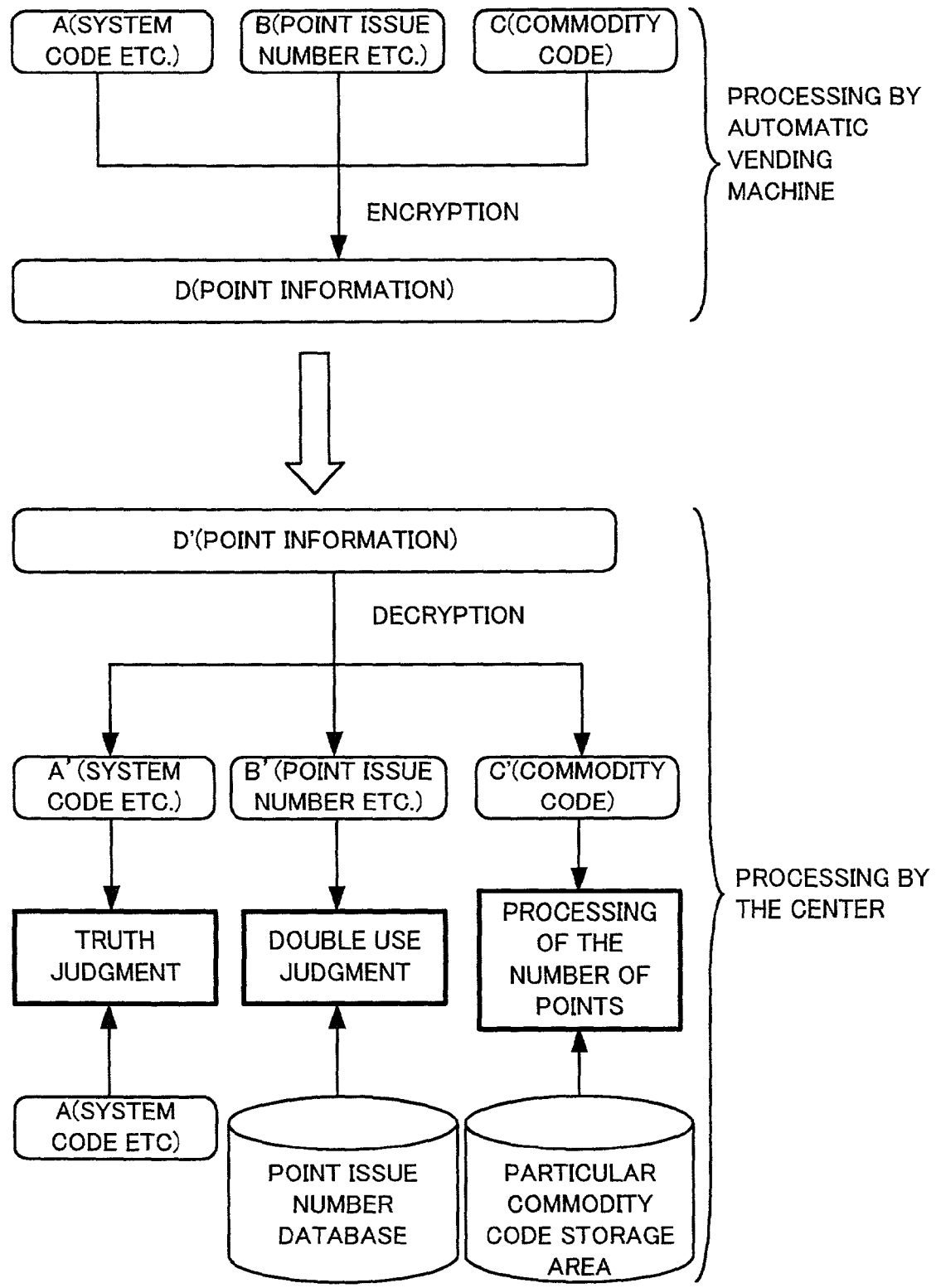
FIG. 3 is a diagram illustrating processing of point information according to the promotion system shown in FIG. 1.

FIG. 3 is a diagram for illustrating the details of processing of point information.

As shown in FIG. 3, information (a system code etc.) A peculiar to the point system, information (a point issue number etc.) B peculiar to the issued point, and information (a commodity code etc.) C peculiar to each commodity sold by the automatic vending machine 110 are encrypted according to a predetermined cryptographic key to generate point information D, which is then visualized and shown on the point information display section 13.

Then, a purchaser sends the displayed point information D to the data center by means of the portable telephone 130 or the personal computer 140.

The data center 153 having received point information D' (if genuine, it is the same as the point information D) obtains information A', information B' and information C' using a predetermined decryption key.

Then, the information A' and the information (system code etc.) A peculiar to the system previously stored in the data center 153 are compared to check whether the pertinent point information is genuine or not (truth or falsehood judgment).

Further, the information B' is searched in a point issue number database which is managed by the data center 153 to check whether it is unused or not (double use judgment).

And, the data center 153 searches a specific commodity code storage area of the data center 153 which stores commodity codes of commodities whose sales are especially promoted and, if the specific commodity code storage has a commodity code which agrees with the information C', performs point processing to add a predetermined number of points to the number of points obtained from the information B'.

Then, transmission of point information by the portable telephone 130 and processing by the data center 153 will be described.

Figure 4:
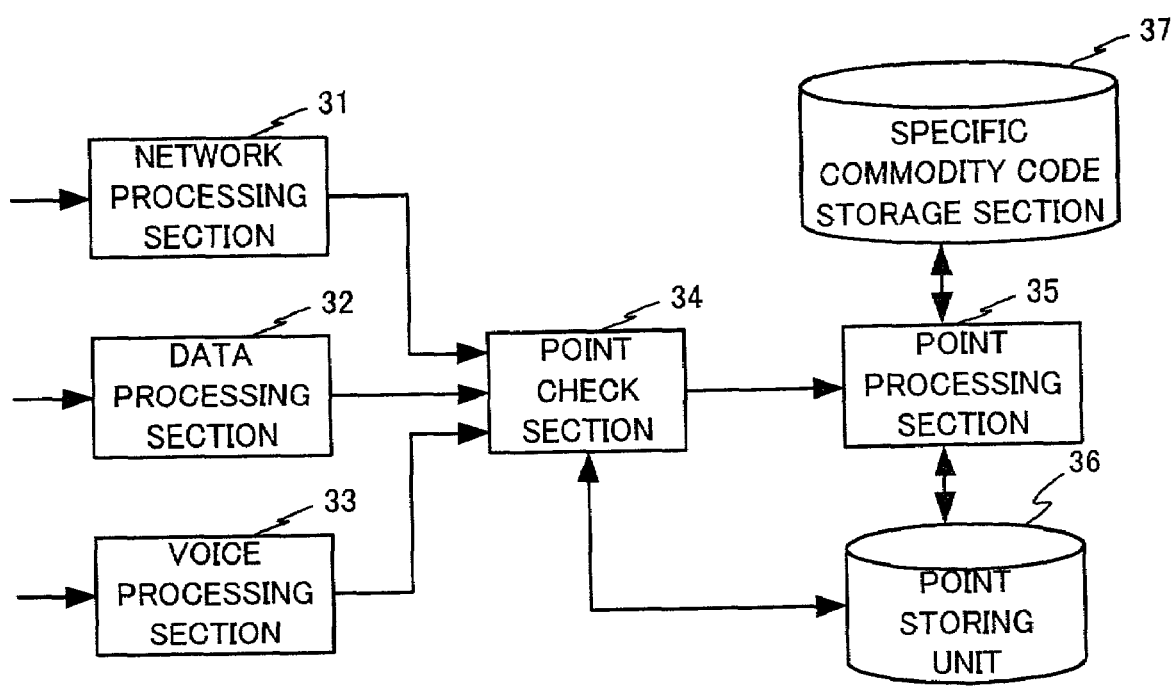
FIG. 4 is a block diagram showing a configuration of the data center shown in FIG. 1.

FIG. 4 is a block diagram showing a detailed structure of the data center 153.

As shown in FIG. 4, the data center 153 comprises network processing section 31, data processing section 32, voice processing section 33, point check section 34, point processing section 35, point storage section 36, and specific commodity code storage section 37.

The network processing section 31 is linked to a network such as the Internet and obtains point information from an unshown mail server or web server.

The network processing section 31 operates when the point information is sent as email or from a predetermined home page, namely sent by the portable telephone 130 or the personal computer 140 compatible with the Internet.

The data processing section 32 obtains point information sent as mail or a data transmission method particular to the portable telephone 130. In other words, the data processing section 32 operates when the point information is sent from the portable telephone 130 having a peculiar data transfer function.

The voice processing section 33 obtains the point information which is sent as the customer voice, push tones or another sound or voice. In other words, the voice processing section 33 operates when the point information is sent as a voice from the portable telephone 130 or a common telephone.

The point check section 34 checks whether the received point information is true or not by the aforesaid method or the like, and if it is checked to be true, further checks whether the point information is unused or not. This processing is performed to check that the same point information is not sent a plurality of times by purchaser's carelessness or malice.

The point processing section 35 manages the point information, which is checked by the point check section 34 to be true and unused, according to the transmitting person (purchaser) and adds the number of points of the received point information to the number of points stored in the point storage section 36. Furthermore, when the commodity code contained in the received point information agrees with the commodity code stored in the specific commodity code storage section 37, the point processing section 35 adds a predetermined number of points to the number of points corresponding to the received point information, and adds the added number of points to the number of points stored in the point storage section 36.

The specific commodity code storage section 37 stores the specific commodity code and the number of points to be added to the number of points of the point information corresponding to the specific commodity code.

It is not necessary to provide all of the network processing section 31, the data processing section 32 and the voice processing section 33, and some of them can be omitted when the point information transmission method is limited. For example, when point information can be sent only by the portable telephone 130 connectable to the Internet, the data processing section 32 and the voice processing section 33 can be omitted.

Then, an operation of the data center 153 will be described with reference to FIG. 5.

Figure 5:
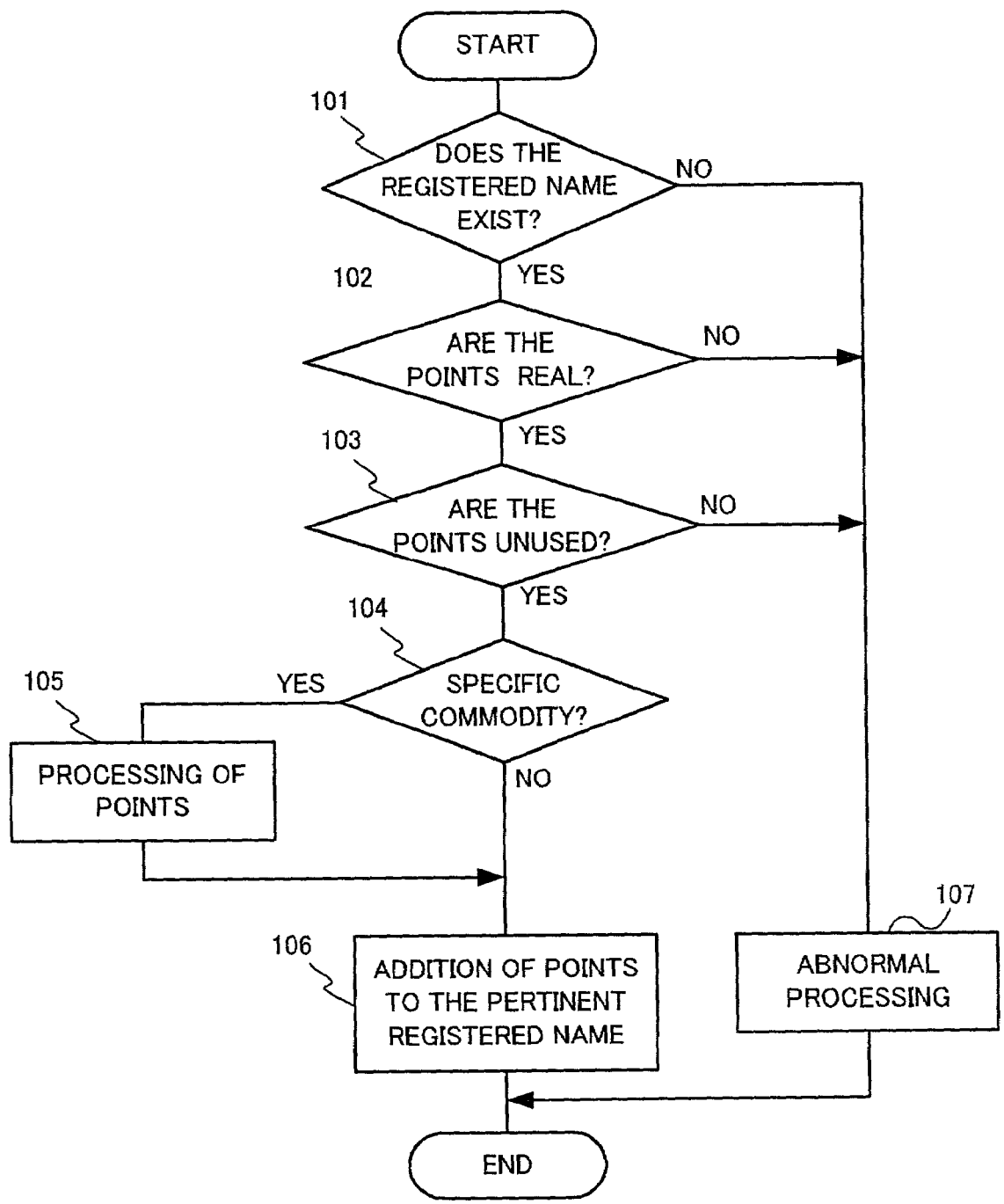
FIG. 5 is a flow chart showing a flow of an operation by the data center shown in FIG. 1.

FIG. 5 is a flow chart showing a flow of the operation of the data center 153 which has received the aforesaid point information.

In FIG. 5, when the data center 153 obtains point information by the network processing section 31, the data processing section 32 or the voice processing section 33, the point check section 34 refers to the point storage section 36 to check whether there is a cash registered name (one cash registered arbitrarily in the name of the point information sending person) received together with the point information (step 101), and when there is a cash registered name (YES in step 101), it is checked whether the point information is true or not (step 102).

And, when it is found that the point information is true (YES in step 102), it is checked whether the pertinent points are not used (step 103).

When it is found that the point information is not used (YES in step 103), it is checked whether the commodity code contained in the point information is a specific commodity stored in the specific commodity code storage section 37 (step 104).

This check whether the commodity code is of this specific commodity or not is performed according to not only whether the commodity code contained in the point information agrees with a specific commodity stored in the specific commodity code storage section 37 but also, when date information of a sold date of the commodity is added to the point information, according to whether the date information is within a predetermined point courtesy period (promotion period).

And, when it is judged that it is a specific commodity (YES in step 104), the point processing section 35 adds a predetermined number of points to the number of points of the pertinent point information (step 105), and adds the added number of points to the number of points of the cash registered name stored in the point storage section 36 before terminating the processing.

When it is judged not to be a specific commodity in the aforesaid step 104 (NO in step 104), the point processing section 35 adds the number of points according to the received point information to the number of points of the pertinent cash registered name stored in the point storage section 36 (step 106) and terminates the processing.

Meanwhile, when there is not a cash registered name (NO in step 101), points are forgery (NO in step 102) or points are used a plurality of times (NO in step 103), it is determined as abnormal processing, and the processing is terminated without adding the number of points (step 107).

The abnormal processing is not limited to no addition of points but also can accumulate the number of abnormal processing times in the pertinent cash registered name and, when the abnormal processing occurs not less than a predetermined number of times, can delete the pertinent registration. And, when there is not a cash registered name, new registration may be accepted, so that the processing from the step 102 can be performed.

Figure 6:
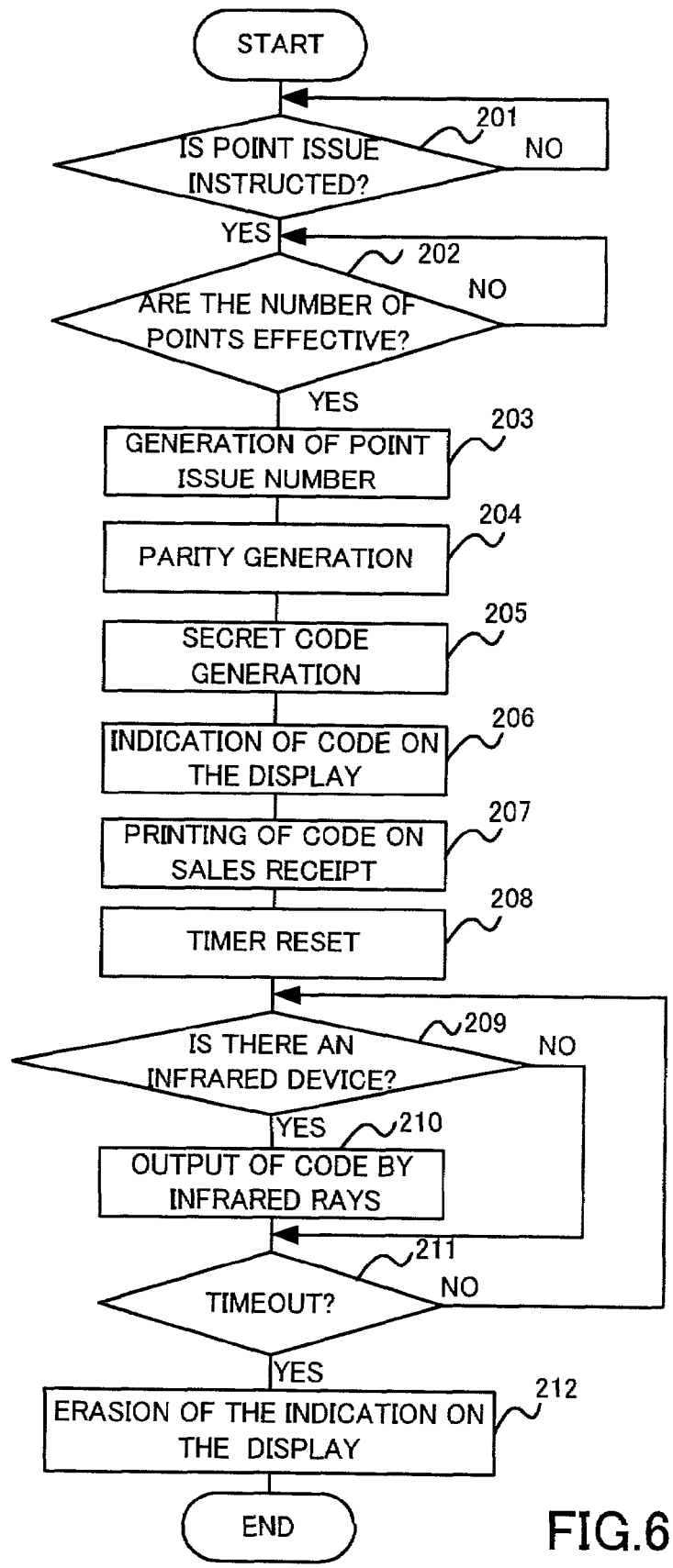
FIG. 6 is a flow chart showing detailed processing of the point issuing device shown in FIG. 1.

FIG. 6 is a flow chart showing detailed processing of the point issuing device (point issuing unit 111 or 121) shown in FIG. 1.

In FIG. 6, the point issuing unit checks whether the automatic vending machine 110 or the cash register 120 instructs to issue points (step 201). Here, when it is judged that there is no instruction to issue points, the processing returns back to step 201, and the point issuing unit waits for an instruction to issue points.

When the automatic vending machine 110 or the cash register 120 instructs to issue points in step 201 (YES in step 201), it is checked whether the number of points whose issue is instructed is effective or not (step 202). Here, when it is judged to be ineffective (NO in step 202), the processing returns back to step 202, but when it is judged to be effective (YES in step 202), a point issue number is generated (step 203). The point issue number is generated with 1 added to the previously issued point issue number.

Then, parity is generated (step 204). For example, to generate parity, information about the point issue number generated in the step 203 and the number of points which is judged to be effective in the step 202 are delimited with each n bit and added, the obtained value is dividing by m to obtain the remainder.

Further, the commodity code of the commodity sold by the automatic vending machine 110 or the cash register 120 is obtained.

And, a secret code is generated (step 205). This secret code is generated by encrypting the aforesaid point issue number, the number of points, the parity and the commodity code by a previously stored cryptographic key.

The secret code generated as described above is shown on a display of the point issuing unit as point information together with a module code of the point issuing unit (step 206) and also printed on the receipt (step 207).

Then, a timer for limiting the indication of the point information on the display is reset (step 208), and it is checked whether the point issuing unit has an infrared device for outputting the point information (step 209).

When it is judged that it has an infrared device (YES in step 209), the aforesaid point information (code) is output by infrared rays (step 210).

Then, it is checked whether the timer has expired (step 211), and if not (NO in step 211), the processing returns back to the step 209, but if judged expired (YES in step 211), the indication on the display is erased (step 212), and the processing is terminated.

What is claimed is:

1. A promotion method comprising the steps of:
   providing an automatic vending machine,
   said automatic vending machine presenting point information related to predetermined points added with a commodity code particular to a commodity used to identify the commodity when a commodity is sold by an automatic vending machine to a user by a point issuing device provided in the automatic vending machine;
   said automatic vending machine transmitting, to a center unit by the user, the point information presented by the point issuing device in the point information presenting step together with identification information of the user by the operation of a portable terminal carried by the user;
   receiving, by the center unit, the point information transmitted by the user in the point information transmitting step and the identification information of the user;
   selectively processing, by the center unit, points corresponding to point information containing a particular commodity code among the point information received in the receiving step;
   totaling and managing, by the center unit, the points processed in the processing step and points corresponding to point information not containing the particular commodity code, in connection with the user identified by the identification information; and
   providing a predetermined service corresponding to the points totaled and managed in the totaling and managing step to the user by referring to the points totaled and managed in the totaling and managing step.

2. The promotion method according to claim 1, wherein the point information presenting step comprises the step of presenting, to the user, point information including a commodity code corresponding to a column number of the automatic vending machine in which the commodity is stored.

3. The promotion method according to claim 1, wherein the point information presenting step comprises the step of presenting, to the user, point information including a commodity code corresponding to a serial number indicated on the commodity.

4. The promotion method according to claim 1, wherein the point information presenting step comprises the step of presenting, to the user, point information including a commodity code based on the information on a bar code related to and indicated on the commodity.

5. The promotion method according to claim 1, wherein the processing step comprises the step of comparing the commodity code included with the received point information with a previously stored particular commodity code and, when they agree with each other adding a predetermined point to the points corresponding to the point information containing the commodity code.

6. The promotion method according to claim 1, wherein:
   the point information presenting step comprises the step of presenting, to the user, point information including the commodity code peculiar to the commodity for identifying the commodity and information of a date when the commodity is sold; and
   the processing step comprises the step of adding predetermined points to points corresponding to the point information containing the commodity code, when the commodity code included with the point information agrees with a predetermined commodity code and the date information added to the point information is within a predetermined period.

7. A promotion system comprising:
   point information issuing means provided in an automatic vending machine for presenting, to a user, point information related to a predetermined point which includes a commodity code peculiar to a commodity for identifying the commodity when the commodity is sold;
   a center unit which stores and manages, in connection with the user, points corresponding to the point information presented by the point information issuing means;
   communication means for transmitting the point information presented by the point information issuing means together with identification information of the user to the center unit;

point processing means provided in the center unit for translating the point information transmitted by the communication means and selectively processing points corresponding to the point information containing a particular commodity code among the translated point information;

totaling and managing means for totaling and managing the points processed by the point processing means and points corresponding to point information not containing the particular commodity code, in connection with the user identified by the identification information; and service providing means for providing, to the user, a predetermined service corresponding to the points totaled and managed by the totaling and managing means by referring to the points totaled and managed by the totaling and managing means.

8. The promotion system according to claim 7, wherein the point information issuing means presents, to the user, point information including a commodity code corresponding to a column number of the automatic vending machine in which the commodity is stored.

9. The promotion system according to claim 7, wherein the point information issuing means presents, to the user, point information including a commodity code corresponding to a serial number indicated on the commodity.

10. The promotion system according to claim 7, wherein the point information issuing means presents, to the user, point information including a commodity code based on information on a bar code related to and indicated on the commodity.

11. The promotion system according to claim 7, wherein the point processing means compares the commodity code included with the received point information with a previously stored particular commodity code and, when they agree with each other, adds a predetermined point to the points corresponding to the point information including the commodity code.

12. The promotion system according to claim 7, wherein:
the point information issuing means presents, to the user, point information including the commodity code peculiar to the commodity for identifying the commodity and information of a date when the commodity is sold; and
the point processing means adds predetermined points to points corresponding to the point information containing the commodity code, when the commodity code included with the point information agrees with a predetermined commodity code and the date information added to the point information is within a predetermined period.

* * * * *